T. LACEY.
HITCHING DEVICE.
APPLICATION FILED MAR. 3, 1915.
1,187,433.
Patented June 13, 1916.
2 SHEETS—SHEET 1.
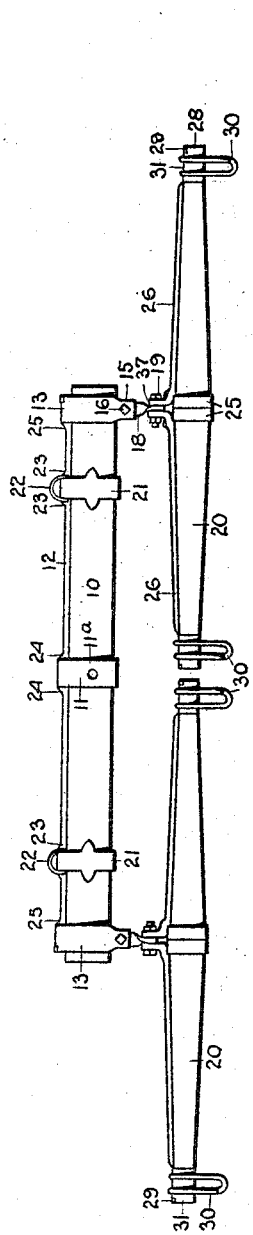
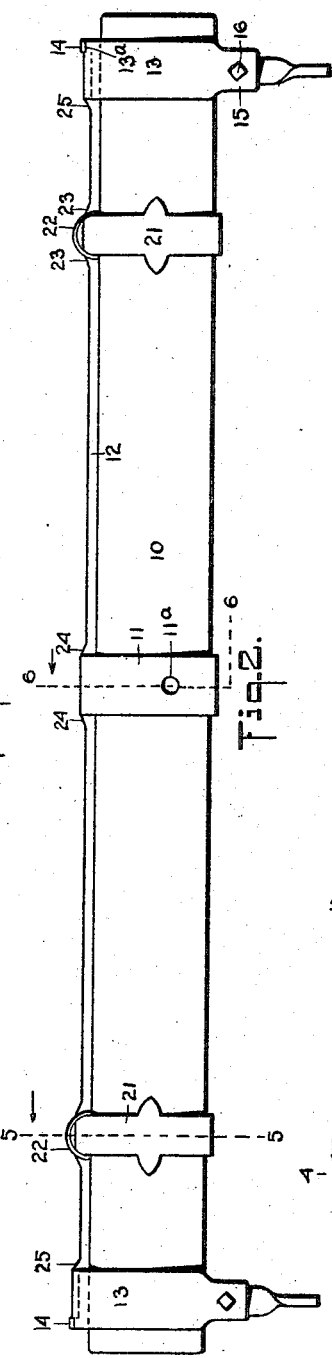
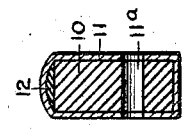
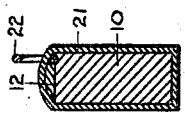
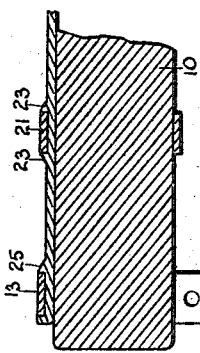
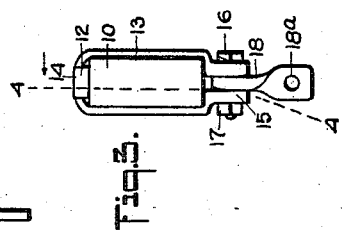
WITNESSES
INVENTOR
Thomas Lacey
BY
ATTORNEYS

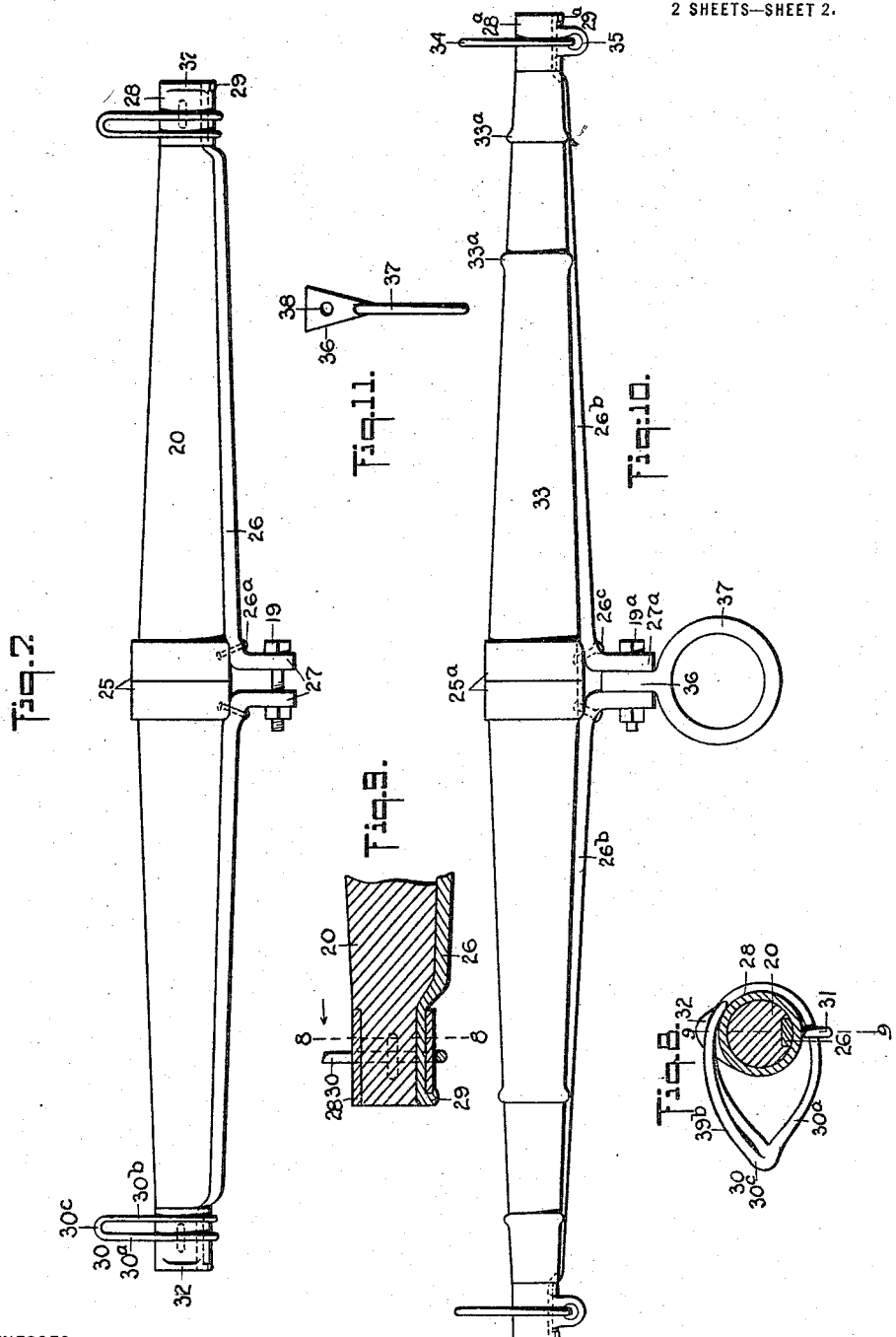

UNITED STATES PATENT OFFICE.

THOMAS LACEY, OF SHONKIN, MONTANA.

HITCHING DEVICE.

1,187,433.  Specification of Letters Patent.  Patented June 13, 1916.

Application filed March 3, 1915. Serial No. 11,737.

*To all whom it may concern:*

Be it known that I, THOMAS LACEY, a citizen of the United States, and a resident of Shonkin, in the county of Chouteau and State of Montana, have invented a new and Improved Hitching Device, of which the following is a full, clear, and exact description.

My invention relates to a hitching device in the form of a draft tree, either double or single, or in the form of a neck yoke.

More particularly my invention relates to a hitching device of the indicated character in which the wooden body is reinforced by metal members.

Objects of the invention are to provide a hitching device in which the wooden body is bound and braced by metal elements so formed and arranged as to be securely held against displacement on the wooden body without weakening the latter; and to provide a draft device with reinforcing and strengthening members so arranged that the strain will be essentially received by the metal members and be so communicated to the wood body as to be exerted on the latter largely in an endwise direction, whereby a lower grade of wood may be employed.

Other objects and advantages will appear from the following description of the illustrated embodiments of the invention.

Reference is had to the accompanying drawings forming part of this specification, in which similar characters of reference indicate corresponding parts in all the views, and in which, Figure 1 is a plan view of a double tree and swingle trees embodying my invention; Fig. 2 is an enlarged plan view of the double tree; Fig. 3 is an end view of the double tree; Fig. 4 is a fragmentary longitudinal vertical section on the line 4—4 Fig. 3, the link bar for coupling a swingle tree being omitted; Fig. 5 is a transverse vertical section on the line 5—5, Fig. 2; Fig. 6 is a transverse vertical section on the line 6—6, Fig. 2; Fig. 7 is a plan view of one of the swingle trees illustrated in Fig. 1, on an enlarged scale; Fig. 8 is a central cross-section of the swingle tree, on line 8—8, Fig. 9; Fig. 9 is a detail longitudinal section on line 9—9, Fig. 8; Fig. 10 is a plan view of a neck yoke embodying my invention; and Fig. 11 is an edge view of the tongue-receiving ring of the neck yoke.

Referring to the draft trees shown in Figs. 1 to 7, the double tree comprises an elongated wood body 10. At the center the said wood body is embraced by an iron band 11, and the said body and band have a bolt hole 11$^a$ therethrough for the connection of the double tree to a tongue, a clevis, or the like. Welded to the central band 11 is an elongated reinforcing bar 12 which ranges along the back of the wood body 10 and extends from each side of the band 11 through and beneath end bands 13. A clenched engagement is effected between the reinforcing bar 12 and the end bands 13 by upsetting the terminals of the said reinforcing bar as at 14, the upset terminals being received in notches 13$^a$ in the said end bands.

The end bands 13 in the case of the double tree are in the form of split bands presenting parallel ears 15, and a link 18 is secured at one end between said ears by a bolt 16 and nut 17, as best seen in Figs. 2 and 3. The link 18 is in the form of a twisted bar link, and at the opposite end from the bolts 16, each link has a bolt hole 18$^a$ to receive a bolt 19 for connecting said link with a swingle tree 20, as hereinbefore explained.

In addition to the central band 11 and the end bands 13, the wooden body 10 is bound by stay chain bands 21 to secure the chain rings or loops 22, here shown as in the form of D-loops. As the stay chains form no part of the invention, they are not here shown. Like the central band 11 and end bands 13, the bands 21 are welded to the reinforcing bar 12. Adjacent to each of the said bands the reinforcing bar 12 is formed with shoulders, there being shoulders 23 indicated adjacent to the bands 21, shoulders 24 adjacent to the band 11, and shoulders 25 adjacent to the bands 13, whereby to resist any strain on the bands endwise of the double tree.

On each swingle tree 20 instead of a single central band 11 as in the case of the double tree, the swingle tree is bound by a two-part or sectional band 25 the members of which slip on to the swingle tree from the ends and lie adjacent to each other, tightly fitting the swingle tree at the center. Welded or otherwise firmly secured to each band section 25 is a reinforcing bar 26, there being employed in the illustrated form rivets 26$^a$ in addition to welding. The said bars 26 extend in opposite directions to the ends of the swingle tree along the back of the latter. On each reinforcing bar 26 is a rearwardly extending lug 27, the lugs of the respective bars being parallel and spaced to receive the adjacent end of the twisted bar link 18 and receiving the securing bolt 19.

It will be seen that the employment of the twisted link bar coupling 18, the ends of which are received respectively between the lugs 15 on the end bands 13 and the lugs 27 on the reinforcing bars 26, as well as the bolts 16, 19, at right angles to each other, serves to give a true center draft. Moreover, the swingle tree will be maintained truly in a level position and the ends prevented from dropping either under the tongue of the vehicle, or between the wheel spokes.

At each end of the whiffle-tree the bar 26 passes under hitch hook bands 28 in the form of ring ferrules, and the ends of the reinforcing bars 26 are clenched as at 29 over the outer edge of the bands 28. On each band of each swingle tree 20 is a hitch hook 30, of novel form, best shown in Figs. 7 and 8. It will be seen that the hook includes a loop shank fitting loosely on the band or ring 28 and held against displacement longitudinally of the swingle tree by extending through a staple or keeper 31. Thus the shank of the hitch hook may have limited turning movement about the ring 28. The integral bill $30^a$ of the hitch hook 30 is return bent in curved form approximately parallel with the elliptical shank of the hook, so that a bend $30^b$ is formed to receive the usual tree or chain (not shown). The terminal of the bill $30^a$ of the hook lies adjacent to the ring 28, and at the inside of the latter, or toward the center of the swingle tree 20.

As best seen in Fig. 7, a strain exerted by the hitch hook at the bend $30^b$ will be borne equally by the shank and bill of the hook, thereby preventing, to a large extent, any strain tending to straighten out the bill. Moreover, a strain exerted on the bill tending to straighten out the same will be resisted by the curved terminal of the bill $30^b$ contacting with the band or ring 28. There is also formed on each band or ring 28 a lug 32 integral with the ring and disposed preferably diametrically opposite to the keeper 31 to further prevent endwise displacement of the hitch hook 30.

The arrangement of the reinforcing bars and strengthening bands on the double tree and swingle trees causes the reinforcing bars to act as rub irons, and the strain is largely borne by the reinforcing elements, and through the said elements the strain will be exerted largely lengthwise of the wood body of the double tree and swingle trees. The engagement of the end bars by the reinforcing bars maintains the hitch hooks 30 and coupling links 18 against longitudinal displacement. Moreover, the form of the hitch hooks will permit any ordinary form of tug or trace to be hitched with facility and without any danger of the trace or tug becoming accidentally unlatched.

Referring to Figs. 10 and 11, in which the invention is shown embodied in a neck yoke, said yoke comprises a wooden body 33 shown as given a more or less ornamental effect by the formation of annular shoulders $33^a$. At the center a wood body 33 is bound by a two-part band $25^a$ similar to the bands 25, and secured to the band sections by welding, and also by rivets $26^c$, if desired, are reinforcing bars $26^b$ which extend from the said band sections in opposite directions to the ends of the neck yoke. The outer ends of the reinforcing bars $26^b$ pass beneath ring ferrules $28^a$ on the neck yoke at the ends of the wood body, and are clenched as at $29^a$ to the said ferrules, similarly to the bar 26. On the ring ferrules $28^a$ are yoke strap rings 34 held in place, in the present example, by integral eyes 35 on the said ring ferrules.

At the inner ends the bars $26^b$ are formed with parallel flanges $27^a$ which receive a tang or shank 36 on the tongue ring 37 of the neck yoke, said tang having a bolt hole 38 to receive the bolt $19^a$ which secures the said tang 36 between the flanges $27^a$. As shown in Fig. 11, the tang 36 is of keystone shape, being broadened toward its outer end, the purpose of which is to allow ample material for wear, whereby when the bolt hole 38 becomes enlarged, bolts of larger size may be received for securing the ring 37.

Having thus described my invention, what I claim as new and desire to secure by Letters Patent, is:

1. A hitching device of the character described, comprising an elongated wooden body, a central metal band formed in two band sections embracing the body at the center, metal bands on the body at the ends, and metal reinforcing elements united respectively to the separate central band sections and extending therefrom longitudinally on the body to the ends of the latter, the said reinforcing elements having engagement with the end bands and serving to retain the same in place on the body.

2. A hitching device of the character described, comprising an elongated wooden body, two separate band sections juxtaposed at the center of the body, there being lateral members at the bands spaced apart to receive an additional hitch element therebetween, a bolt extending transversely through the said members, longitudinal reinforcing elements extending in opposite directions from the said central band sections to the ends of the body, and end bands on the body engaged by the terminals of the said reinforcing elements.

3. The herein described draft trees, comprising a double tree having a wooden body, metal reinforcing elements ranging longitudinally of the body, and end bands on the wooden body engaged by the said reinforcing elements at the outer ends of the latter, said end bands having flanges; twisted bar links, each having one end received between said flanges of the respective end bands and bolted thereto; swingle trees having wooden bodies; metal reinforcing elements on the wooden bodies of the swingle trees and ranging longitudinally thereof; means at the center holding the said reinforcing elements to the wooden bodies of the swingle trees, the said reinforcing elements presenting spaced flanges at the center of the swingle trees, the said bar links having the ends of the double trees received between the flanges of the swingle trees and bolted to the latter flanges.

In testimony whereof I have signed my name to this specification in the presence of two subscribing witnesses.

THOMAS LACEY.

Witnesses:
E. J. BALL,
GEORGE F. HUGHES.

Copies of this patent may be obtained for five cents each, by addressing the "Commissioner of Patents. Washington, D. C."